Nov. 15, 1955  W. O. BECHMAN  2,723,767
VEHICULAR BOOM CARRIER
Filed June 14, 1952 2 Sheets-Sheet 1
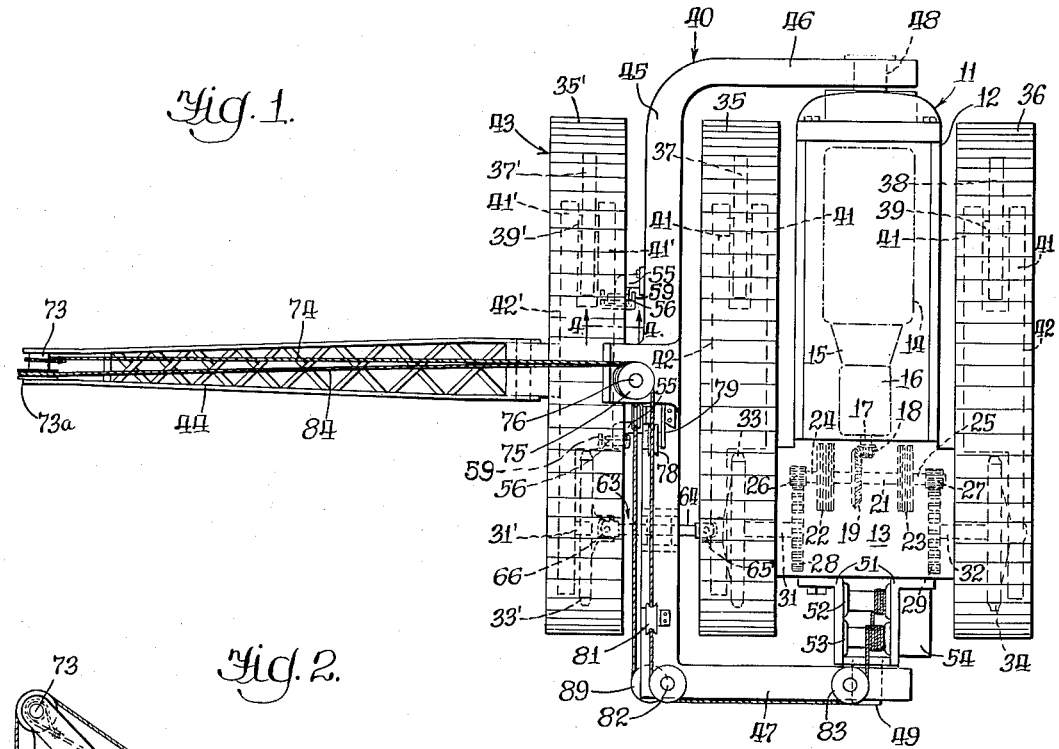
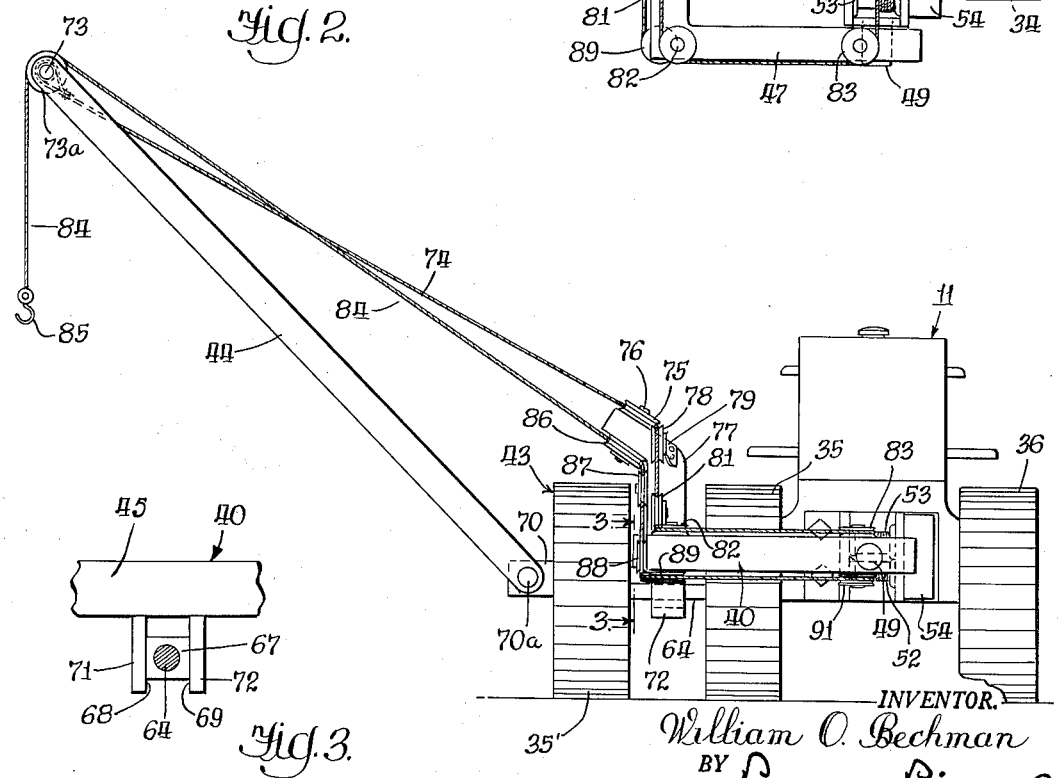
INVENTOR.
William O. Bechman
BY Paul O. Pippel
Atty.

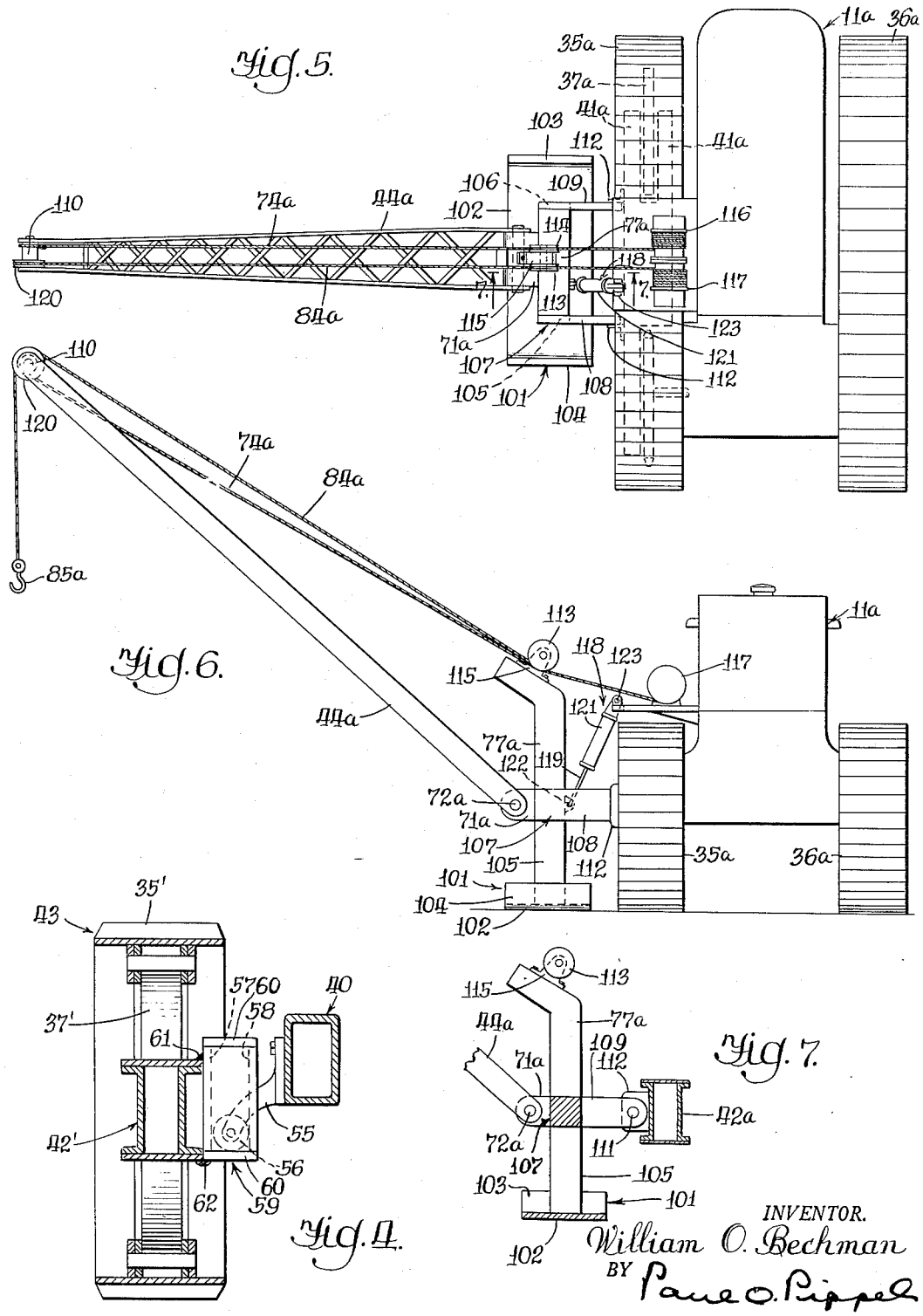

United States Patent Office 2,723,767
Patented Nov. 15, 1955

2,723,767

VEHICULAR BOOM CARRIER

William O. Bechman, Chicago, Ill., assignor to International Harvester Company, a corporation of New Jersey Application June 14, 1952, Serial No. 293,693

8 Claims. (Cl. 212—145)

This invention has to do with booms transportable with land vehicles and more particularly concerns a vehicular boom carrier unit wherein there is a ground-engaging boom-mounting outrigger for the vehicle and a boom-supporting line for utilizing the vehicle as a dominant counterweight for a load supported upon the boom.

Crawler tractors are commonly used as vehicular carriers for derricks or booms. Usually one of the track frames at a side of such vehicle is used as a pivot footing for the boom which is supported in an upwardly and outwardly projecting position with reference to the vehicle. Initially the relatively great mass of the crawler type vehicle was adequate for supporting the mass of loads contemplated for booms of this type. As new uses developed for such vehicular-mounted booms the weight of loads desired to be supported thereby increased and to accommodate these greater loads counterweights were placed on the side of the vehicle opposite to that upon which the boom is mounted. Eventually, to further increase the weight of loads liftable by the boom, windlass drums and driving and control gear therefor were also mounted on the opposite side of the vehicle to supplement the counterweights. The present invention contemplates the use of a vehicular boom-carrier for a boom capable of lifting still greater loads and this is accomplished by providing a boom-mounting outrigger for the vehicle and from which outrigger the boom projects laterally outwardly with respect to the vehicle and is supported by a line leading from a projecting portion of the boom into connection with the vehicle in such a way as to use the entire mass of the vehicle as a counterweight for a load carried by the boom.

A further object of this invention is the provision of a boom-supporting outrigger which is vehicular in character either in the sense of being skidable over the ground surface when transported with the vehicle or in the sense of having drivable ground-engaging traction means operable to propel the outrigger at the speed the vehicle is driven.

Another object is the provision of a connecting structure providing an articulate connection between the vehicle and the outrigger to facilitate the ground-engaging portion thereof to rest upon a ground surface of different elevation from that upon which the vehicle rests.

Another object is the provision of an outrigger articulately connected with the vehicle so as to be constrained against movement relative thereto in the direction of vehicle propulsion and having ground-engaging means drivable to propel such outrigger, and an articulate power transmitting means through which the drivable ground-engaging means receives driving force from the vehicle.

Another object is the provision of outrigger connecting means in the form of a large bail having a bight portion extending alongside of the vehicle and end portions extending into pivotal connections with the vehicle at respective ends thereof about a common fore and aft axis.

Still another object is the provision of a bail type outrigger connecting structure according to the next preceding object and wherein there is line payout and takeup means mounted on the vehicle adjacent an end thereof together with sheave means mounted on the bail and a boom-supporting and adjusting line extending from the payout and take-up means and about the sheave means ot an extending portion of a boom on the outrigger.

A further object is the provision of means connected between the vehicle and the outrigger for lifting the latter from the ground surface to a transport position to enable such outrigger and a boom thereon to be transported by the vehicle.

The above and other desirable objects inherent in and encompassed by the invention are elucidated in the ensuing description, the appended claims and the annexed drawings wherein:

Fig. 1 is a plan view of a crawler tractor and a vehicular outrigger and boom associated therewith constituting a preferred embodiment of this invention;

Fig. 2 is a rear end elevational view of the vehicular boom-carrier and boom illustrated in Fig. 1;

Fig. 3 is a fragmentary view partly in section taken on the line 3—3 of Fig. 2;

Fig. 4 is a fragmentary sectional view taken transversely through the vehicular outrigger of this embodiment of the invention substantially at the plane indicated by line 4—4 in Fig. 1;

Fig. 5 is a view taken similarly to Fig. 1 of a modified embodiment of the invention;

Fig. 6 is a rear elevational view of the vehicular boom-carrier and boom illustrated in Fig. 5;

Fig. 7 is an elevational view taken partly in section on the line 7—7 of Fig. 5 to illustrate the ground-engaging portion of the boom-supporting outrigger and the connection of this outrigger with a track frame of the crawler tractor component of this second embodiment of vehicular boom carrier.

The motor driven component of this boom carrier apparatus is a crawler tractor 11 having a body frame 12 projecting forwardly from a final drive housing 13. A tractor engine 14, a main clutch casing 15 and a casing 16 for change speed gearing (not shown) are shown diagrammatically by dot-dash lines. A tail shaft 17 projecting rearwardly from the gear box 16 has the usual beveled pinion 18 for driving a beveled gear 19 in the final drive housing 13. Power is transmitted from the gear 19 through a cross shaft 21 which drives the driving elements of steering clutches 22 and 23. The driven elements of these clutches 22 and 23 are drivingly connected by shafts 24 and 25 with pinion gears 26 and 27 which mesh with and drive large spur gears 28 and 29. Driving axles 31 and 32 transmit driving force from the gears 28 and 29 to driving sprockets 33 and 34 which revolve endless self-laying tracks 35 and 36 at opposite sides of the vehicle. The forward ends of the tracks 35 and 36 are carried upon front idlers 37 and 38. Each idler 37 and 38 is journaled upon a shaft 39 supported between furcations 41 at the front end of a track frame structure 42.

On the left side of the engine driven vehicle 11 is a vehicular outrigger 43 for the mounting of a boom 44. This outrigger 43 is constructed similarly to the vehicle propelling unit 42—35, in having a track frame 42' corresponding to the track frame 42, a track 35' corresponding to the track 35 and other elements designated by reference characters having a prime added but otherwise the same as reference characters designating corresponding parts of the propelling unit 42—35.

This vehicular outrigger 43 is articulately connected with the tractor 11 by a large bail 40 having a straight bight 45 disposed between and in parallelism with the endless tracks 35 and 35'. End portions 46 and 47 of the bail 44 extend into contiguity with opposite ends of the tractor. The front end portion 46 is pivotally mounted on a bearing 48 whereas the rear end portion 47 is pivotally journaled upon a bearing 49. These bearings 48 and 49 have a common axis extending lengthwise of the tractor. Bearing 49 is carried upon the rear end of a large bracket structure 51 which also serves as mounting means for windlasses 52 and 53. Power transmitting means for selectively rotating the windlasses 52 and 53 is contained in a housing 54.

Spaced lengthwise of the bail bight portion 45 are a pair of brackets 55 and each carries a roller 56 rotatable about an axis extending lengthwise of the vehicle.

These rollers 56 are constrained between laterally spaced vertical rails 57 and 58 which are incorporated into a roller guide frame 59 secured to the inner or right side of the track frame 42' by welded connections 61 and 62; see Fig. 4. Rollers 56 are rotatable about a common axis extending lengthwise of the bail bight 45 and accommodate lateral tilting of the outrigger 43 relatively to the bail and relatively to the tractor substantially about such axis. Vertical movement of the outrigger 43 at either end relatively to the bail bight 45 is provided for by movement of the rollers 56 vertically along the rails 57 and 58 within the limits established at the ends of these rails by plates 60.

The endless track 35' constitutes the ground-engaging portion of the outrigger 43 and further constitutes ground-engaging propelling means for this outrigger. Driving force for revolving the track 35' around the peripheries of the driving sprocket 33' therefor and the front idler 37' is derived from the tractor through articulate power transmitting means generally designated 63 comprising a shaft 64 having opposite ends respectively drivingly connected with the axles 31 and 31' by universal joint structures 65 and 66.

Means for connecting the bail 40 with the outrigger 43 to limit relative fore and aft movement of the outrigger and vehicle comprises a bearing block 67 having the shaft 64 journaled therein and having opposite straight faces slidably engaging opposed faces 68 and 69 of bearing guide members 71 and 72 mounted on and projecting downwardly from the bail bight portion 45. This arrangement permits the power transmitting shaft 64 to swing vertically about its connection in the universal joint 65 but reacts against the guides 71 and 72 to prevent swinging motion of this shaft fore and aft of the tractor and thereby prevents relative fore and aft movement of the tractor and the outrigger 43. Universal joint 66 accommodates pivotal movement of the outrigger 43 relative to the bail 40 about a fore and aft axis substantially coinciding with the rollers 56 at their principal axes of rotation.

The outrigger frame 42' has boom-mounting means thereon in the form of a bracket 70 having a pivot 70a for the inner and lower end of the boom 44. An axle 73 at an outwardly projecting portion of the boom 44 rotatably carries a sheave 73a and also serves as an anchorage for an end of a boom-supporting line 74. This line 74 extends under tensile stress from this outer end portion of the projecting boom and above the boom mounting 70—70a into connection with the vehicle 11 through a sheave 75, a pivot 76 for this sheave, a sheave-supporting pedestal 77 carrying the pivot 76 and projecting upwardly from the bail bight 45, and through the bail and its pivots 48 and 49 to the ends of the tractor. Sheave 75 serves as holding means for one end of the flight of line 74 extending between this sheave and the anchorage 73 at the outer end of the boom. From the sheave 75 the line 74 extends about sheave means including a sheave 78 pivotally mounted on a bracket 79 attached to the sheave-supporting superstructure or pedestal 77, and sheaves 81, 82 and 83 pivotally mounted upon the bail 40 to the drum of the windlass 53.

A load-supporting line 84 having a load-engaging hook 85 at its outer end is trained over the sheave 73a from where this line extends to and about a sheave 86 pivotally mounted on the bail-mounted pedestal 77 thence about another sheave 87 also pivotally mounted on the pedestal and bail-mounted sheaves 88, 89 and 91 to and about the drum of winch 52.

Hoisting and support of a load on the hook 85 is accomplished by the load-supporting line 84 and the winch 52, whereas the elevation of the outer end of the boom 44 is controlled through the boom-supporting line 74 and the winch 53 to which this line leads. The flight of the boom-supporting line 74 extending between the upper and outer end of the boom 44 and the sheave 75 is operable to impose the mass of the entire vehicle 11 as a dominant counterweight across the outrigger 43 for a load supported by the boom. This greatly increases the load mass possible to support by the boom in comparison to the mass supportable if the boom were mounted directly upon the vehicle 11 making it possible to employ only part of the vehicle mass as a counterweight for the load.

Inasmuch as the ground-engaging propelling means or track 35' of the outrigger 43 is driven at the same speed and in the same direction as the track 35 on the corresponding side of the vehicle 11, driving and steering of the vehicle is possible while a load is supported by the boom.

Embodiment of Figs. 5, 6 and 7

In the embodiment of Figs. 5, 6 and 7 a tractor 11a corresponding to the tractor 11 in the first embodiment has parts thereof corresponding to parts of the first embodiment tractor designated by the same respective reference characters supplemented by the suffix a. An outrigger 101 in this embodiment of the invention includes a broad runner type ground-engaging element 102 having upwardly curved end portions 103 and 104 to facilitate endwise sliding of this element upon the ground surface. A pair of upright members 105 and 106 are connected with the runner 102 at their lower ends and at their upper ends with a bail 107. The legs 108 and 109 of this bail are pivotally connected by pins 111 to brackets 112 mounted upon the track frame 42a of the tractor.

The inner and lower end of a boom 44a corresponding to the boom 44 is pivotally connected with the bail 107 by boom-mounting means including a pivot pin 72a and a bracket 71a therefor on the bail. A pedestal 77a on the bail 107 has sheaves 113 and 114 pivotally carried thereon by a bracket structure 115. Sheave 114 is engaged by a boom-supporting line 74a which has its outer end anchored to a sheave axle 110 at the outer end of the boom. This line 74a extends to a winch drum 116 on the tractor. A load-supporting line 84a leads from a hook 85a over a sheave 120 on the axle 110 and thence to and past the sheave 113 to winch drum 117 on the tractor.

Although the ground-engaging runner 102 is vehicular in the sense that it can be skidded along the ground when the tractor is driven, this practice would not be followed at higher vehicular speeds even when the boom carried no load. Swinging of the bail upwardly to lift the outrigger 101 from the ground surface into a transport position attendant to faster vehicle speeds is accomplished by a hydraulic ram 118 having its piston rod 119 pivotally connected at 122 with the bail and having its cylinder 121 pivotally connected at 123 with the tractor.

Having described a limited number of embodiments with the view of concisely illustrating the invention, I claim:

1. In a vehicular boom carrier, a motor-driven vehicle, a boom-mounting outrigger having a ground-engaging portion and spaced laterally from the vehicle, a connecting structure pivotally connected with the vehicle about a fore and aft horizontal axis associated with such vehicle and extending into pivotal connection with the outrigger about a fore and aft horizontal axis, said connecting structure being operable to constrain the vehicle and the outrigger against relative fore and aft movement while facilitating the outrigger to rest upon ground surfaces varying in elevation with respect to the vehicle, a boom having a footing portion pivotally mounted on the outrigger and projecting therefrom oppositely with reference to the vehicle, and boom supporting means connected with a portion of the projecting boom and extending above the outrigger into connection with the vehicle to utilize the mass thereof for dominantly counterbalancing the mass of a load supported by the boom.

2. The combination set forth in claim 1 wherein said connecting structure comprises a bail having a bight portion extending lengthwise of the vehicle at a side thereof and end portions extending into pivotal connection with the vehicle at opposite end portions thereof disposed coaxially of said fore and aft axis associated with the vehicle.

3. In a vehicular boom carrier, a motor-driven vehicle, a boom-mounting outrigger having a ground-engaging portion and spaced laterally from the vehicle, a connecting structure pivotally connected with the vehicle about a fore and aft horizontal axis associated with such vehicle and extending into pivotal connection with the outrigger about a fore and aft horizontal axis, said connecting structure being operable to constrain the vehicle and the outrigger against relative fore and aft movement while facilitating the outrigger to rest upon ground surfaces varying in elevation with respect to the vehicle, a boom having a footing portion pivotally mounted on the outrigger and projecting therefrom oppositely with reference to the vehicle, a sheave-supporting superstructure on said connecting structure adjacent to the outrigger, a sheave on said superstructure, and a boom-supporting line trained about said sheave and connected with a portion of the projecting boom.

4. In a vehicular boom carrier, a motor-driven vehicle, a boom-mounting outrigger having a ground-engaging portion and spaced laterally from the vehicle, a connecting structure in the form of a bail having a bight portion spaced laterally from the vehicle and extending lengthwise thereof, the bail also having end portions extending from the bight portion into pivotal connection with the vehicle at respective opposite end portions thereof disposed coaxially of an axis extending fore and aft of the vehicle, a sheave carrier superstructure on the bail bight portion, a sheave on said superstructure, means connecting the bail bight portion with said outrigger to limit relative fore and aft movement of the outrigger and vehicle, a boom mounted on the outrigger and projecting therefrom oppositely with reference to the vehicle, and a boom-supporting line trained about said sheave and connected with a portion of the projecting boom.

5. The combination set forth in claim 4 wherein there is payout and pull-back means on the vehicle adjacent an end of the bail, guide sheave means on the bail between said superstructure and the payout and pull-back means, and said boom-supporting line extending from the boom about said sheave and thence about said guide sheave means to the payout and pull-back means for control thereby.

6. In combination, a vehicle, an outrigger for said vehicle and spaced laterally therefrom, said outrigger comprising a frame structure and ground-engaging traction means drivable to propel such outrigger upon the ground, a connecting structure pivotally connected with the vehicle for up and down swinging motion relatively thereto and projecting therefrom to the outrigger frame structure, and means for interconnecting said structures for relative pivotal movement about a horizontal axis including roller receiving guide means arranged generally upright on one of said structures and complemental roller means in and rollable lengthwise of said guide means, and said roller means being mounted on the other of said structures for rotation about a horizontal axis.

7. In combination, a vehicle, an outrigger for said vehicle and comprising a frame structure entirely at one side of the vehicle and a ground-engaging traction means in support of such frame structure and drivable to propel such outrigger upon the ground, a connecting structure pivotally connected with the vehicle to accommodate up and down swinging motion thereof relatively to the vehicle and articulately connected with said frame structure to accommodate change in elevation of the outrigger relative to the vehicle independently of tilting with the connecting structure attendant to such up and down swinging movement of the connecting structure, and means for opposing relative movement of the outrigger relatively to the vehicle in a fore and aft direction comprising bearing components respectively upon said connecting structure and connected with the outrigger frame structure.

8. The combination set forth in claim 7 wherein the vehicle and the outrigger comprise respective traction means, driving axles respectively for said traction means and arranged substantially in axially spaced relation, a power transmitting shaft disposed endwise between said axles, universal joints between opposite ends of the shaft and respective of the axles, the one of said bearing components upon said connecting structure being cooperable with the other component to constrain such other component for movement within a vertical plane extending transversely of the vehicle, and said other bearing component being mounted upon said power transmitting shaft and providing a journal therefor wherein said shaft can rotate about its principal axis.

References Cited in the file of this patent

UNITED STATES PATENTS

| | | |
|---|---|---|
| 1,448,372 | Bager et al. | Mar. 13, 1923 |
| 1,457,397 | Shafer, Jr. | June 5, 1923 |
| 1,459,779 | Lichtenberg | June 26, 1923 |
| 1,943,196 | Ward | Jan. 9, 1934 |
| 2,109,388 | Heller | Feb. 22, 1938 |
| 2,393,916 | Lawler | Jan. 29, 1946 |